(12) United States Patent
Kudo et al.

(10) Patent No.: US 7,983,641 B2
(45) Date of Patent: Jul. 19, 2011

(54) CABLE COMMUNICATION APPARATUS AND CABLE COMMUNICATION METHOD

(75) Inventors: Katsuya Kudo, Fukaya (JP); Masami Oosawa, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 720 days.

(21) Appl. No.: 12/105,987

(22) Filed: Apr. 18, 2008

(65) Prior Publication Data

US 2008/0313694 A1 Dec. 18, 2008

(30) Foreign Application Priority Data

Jun. 18, 2007 (JP) ................................. 2007-160278

(51) Int. Cl.
*H04B 1/06* (2006.01)
*H04B 7/00* (2006.01)

(52) U.S. Cl. .................. 455/234.2; 455/245.1; 725/131; 370/493

(58) Field of Classification Search ....... 455/230–253.2; 725/100, 111, 131; 370/480, 487, 493
See application file for complete search history.

(56) References Cited

U.S. PATENT DOCUMENTS

| 5,956,075 A | 9/1999 | Matsuo |
| 6,714,261 B1 | 3/2004 | Matsuura |
| 6,751,803 B1 | 6/2004 | Matsuura |
| 2006/0256799 A1* | 11/2006 | Eng .............................. 370/401 |

FOREIGN PATENT DOCUMENTS

| EP | 1 056 289 | 11/2000 |
| JP | 3249224 | 9/1994 |
| JP | 10042266 | 2/1998 |
| JP | 2000307456 | 11/2000 |
| JP | 2001008179 | 1/2001 |
| JP | 2001045450 | 2/2001 |
| JP | 2001333395 | 11/2001 |
| JP | 2006352907 | 12/2006 |

* cited by examiner

*Primary Examiner* — Christian A Hannon
(74) *Attorney, Agent, or Firm* — Blakely, Sokoloff, Taylor & Zafman LLP

(57) ABSTRACT

A STB 1 of this CATV system includes a diplexer 11, a signal level adjusting unit 30, a splitter 12, a tuner 2, a demodulating unit 3, a memory 17, and a CPU 19. The CPU 19 finds a correct reception level of a downstream signal by arithmetically operating a level correction value which is found based on a detected level adjustment state (state of switches) of the signal level adjusting unit 30 and a reception level after AGC which is found from signal intensity outputted from the demodulating unit 3, and notifies the found reception level to a CATV center station 40 by means of an upstream signal.

13 Claims, 6 Drawing Sheets

CABLE COMMUNICATION APPARATUS AND CABLE COMMUNICATION METHOD

CROSS-REFERENCE TO RELATED APPLICATIONS

This application is based upon and claims the benefit of priority from the prior Japanese Patent Application No. 2007-160278, filed on Jun. 18, 2007; the entire contents of which are incorporated herein by reference.

BACKGROUND OF THE INVENTION

1. Field of the Invention

The present invention relates to, for example, a cable communication apparatus and a cable communication method.

2. Description of the Related Art

As one of techniques for receiving a signal from a cable television network (hereinafter, referred to as a "CATV network") at a CATV receiving terminal, there has been proposed a technique in which, for example, a radio-frequency amplifier and a variable attenuator on a preceding stage of the radio-frequency amplifier are provided in a RF circuit of a CATV receiving terminal, thereby reducing distortion of a signal inputted to the CATV receiving terminal from a CATV network (see, for example, JP-A 11-15425 (KOKAI)).

In this CATV receiving terminal, when a high input electric field is inputted, a radio-frequency wave detector and a gain control circuit control the variable attenuator so as to increase an attenuation amount of the input signal, thereby lowering the input to the radio-frequency amplifier and thus reducing distortion of the input signal and improving reception quality.

SUMMARY OF THE INVENTION

In recent-year CATV systems, signals sent to a CATV network from a center station includes not only conventionally existing TV signals but also data communication signals intended for the Internet connection.

When signals thus including TV signals and data communication signals are sent from a center station to a CATV network, the level of the data communication signals is often set lower than the level of the TV signals in normal cases in order to prevent the data communication signals from deteriorating reception quality of the TV signals.

On a side receiving CATV signals (a subscriber's premise and the like), it is necessary to branch a RF wiring cable, one of which is connected to a CATV receiving terminal and the other of which is connected to a cable modem, and to adjust the level of signals to be used which have been taken out from RF signals received at the respective devices.

Further, in developing cable modems, they have to comply with standards of countries where they are on the market, for example, cable modems which are designed for the market in the United States have to comply with DOCSI (Data Over Cable Service Interface Specifications) and so on.

The DOCSIS demands that cable modems should be provided with a function of notifying a center station of the level of a downstream signal (data communication reception signal) with a certain range of accuracy.

Since the DOCSIS is becoming an industry standard for technical specification for data communication utilizing a CATV network, cable modems to be developed in future need to be DOCSIS compliant and at the same time need to internally divide received RF signals into TV signals and data communication signals and process these signals separately.

As described above, in a case where CATV signals are received at a house or the like, a splitter of RF signals is attached to a coaxial receptacle provided on a wall or the like, and the branched RF signals are separately processed by a CATV receiving terminal for CATV viewing (for example, a CATV tuner or the like) and a cable modem.

The cable modem transmits signals not only in a downstream direction but also in an upstream direction.

At this time, an upstream signal transmitted from the cable modem sometimes enters the CATV tuner through the splitter.

Therefore, the development of integrated hardware which has the functions of both a CATV tuner and a cable modem (hereinafter, referred to as a "set-top box") and in which the influence of the signal entrance is taken into consideration is an urgent necessity.

In this case, a branching filter circuit for separating an upstream signal and a downstream signal, a gain control circuit, a splitter, a tuner circuit after the distribution, and so on have to be mounted on a RF stage in the set-top box.

However, as is pointed out in the aforesaid prior technique, if the gain control circuit is mounted on the radio-frequency wave detector, the level of a reception signal is automatically variable-controlled by a self loop of the radio-frequency wave detector, the gain control circuit, and the variable attenuator, and therefore, it is not possible to detect the correct level of the reception signal from a data communication signal which is distributed to a cable modem circuit side after being gain-controlled.

This poses a problem that it is not possible to realize the function prescribed by the DOCSIS, that is, the function of notifying the center station of the correct level of the data communication reception signal.

The present invention was made to solve such a problem, and its object is to provide a cable communication apparatus and a cable communication method which are capable of gain-adjusting a signal in a RF stage, processing, with high quality, a data communication signal separated from the signal, and notifying the correct reception level of the data communication reception signal to a center station as is prescribed by the DOCSIS, in a case where the cable communication apparatus receives the signal including both a video signal and the data communication signal from a CATV network and internally separates and outputs the signals.

A cable communication apparatus according to one aspect of the present invention includes: a branching filter branching a downstream first RF signal sent from a CATV network and an upstream second RF signal which is in a frequency band different from a frequency band of the first RF signal, according to the frequency bands; a gain adjusting unit adjusting a gain of the first RF signal received through said branching filter, upon receiving control or an operation; a splitter distributing the first RE signal gain-adjusted by said gain adjusting unit to a plurality of lines; a receiving unit having an auto gain control circuit controlling a gain of the first RF signal of at least one line out of the plural lines to which the first RF signal is distributed by said splitter, and obtaining a data processing reception signal from the signal gain-controlled by the auto gain control circuit; a memory storing gain adjustment states of said gain adjusting unit and level correction values of the first RF signal in correspondence to each other; and a reception level notifying unit calculating a reception level of the reception signal by using the level correction value of the first RF signal, which is read from said memory according to the gain adjustment state of said gain adjusting unit, and information indicating a reception state of the reception signal, and transmitting the calculated reception level on the CATV network through said branching filter by the second RF signal.

A cable communication method according to another aspect of the present invention includes: branching downstream a first RF signal sent from a CATV network; adjusting, by a gain adjusting unit, a gain of the first RF signal upon receiving a control or an operation; distributing the gain-adjusted first RF signal to a plurality of lines; obtaining a data processing reception signal from a signal resulting from auto gain control of the first RF signal of at least one line out of the plural lines to which the first RF signal is distributed; storing, in a memory, gain adjustment states of the gain adjusting unit and level correction values of the first RF signal in advance in correspondence to each other; calculating a reception level of the reception signal by using the level correction value of the first RF signal, which is read from the memory according to the gain adjustment state of the gain adjusting unit, and information indicating a reception state of the reception signal; and transmitting the calculated reception level of the reception signal on the CATV network by an upstream second RF signal which is in a frequency band different from a frequency band of the first RF signal.

Therefore, in a case where the cable communication apparatus receives a signal including both a video signal and a data communication signal from a CATV network and internally separates and outputs the signals, it is possible to gain-adjust the signal in a RF stage, process, with high quality, the data communication signal separated from the signal, and notify the correct reception level of the data communication reception signal to a center station as is prescribed by the DOCSIS.

DESCRIPTION OF THE EMBODIMENTS

Hereinafter, embodiments of the present invention will be described in detail with reference to the drawings.

Figure 1:
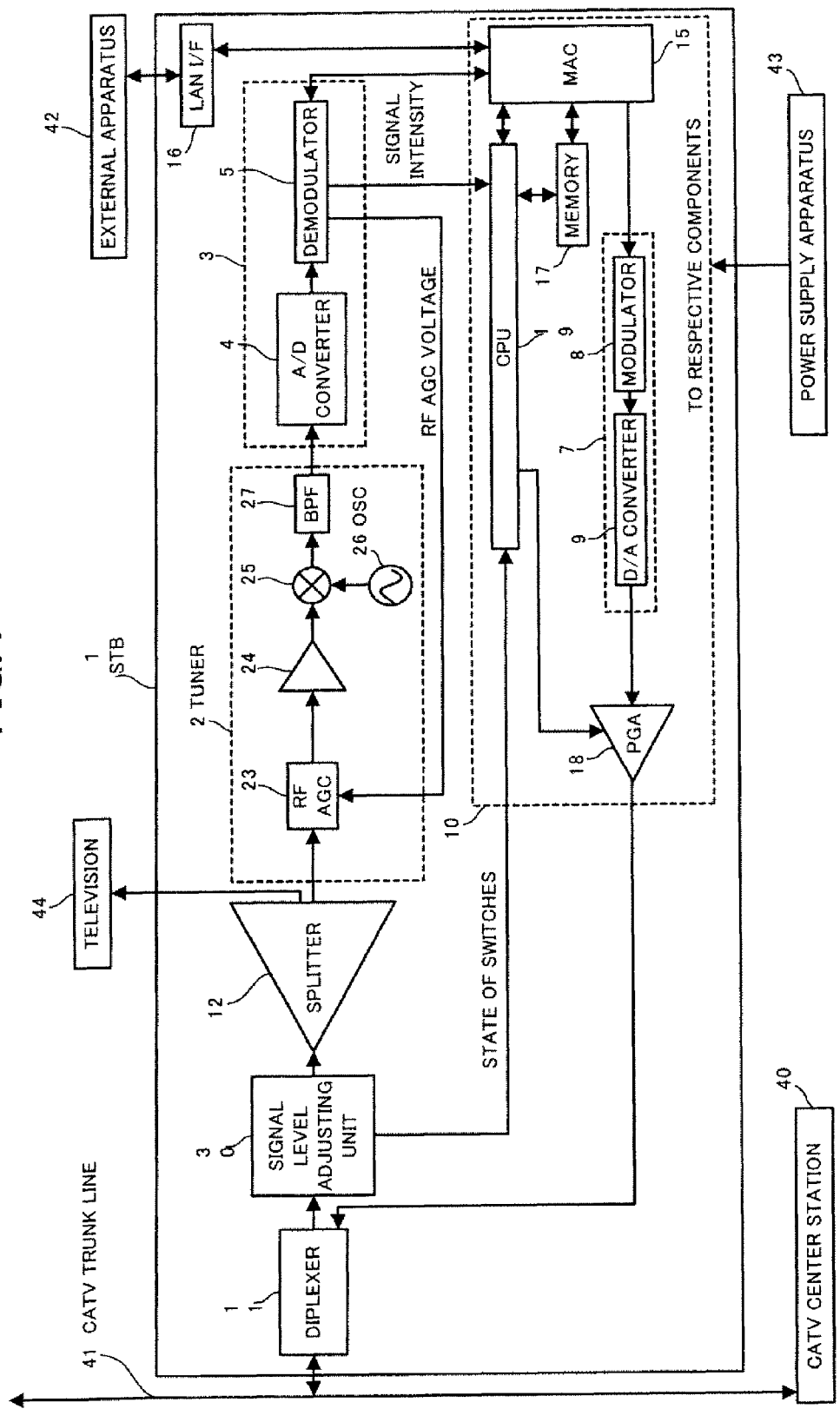
FIG. 1 is a diagram showing the configuration of a CATV system of a first embodiment.

FIG. 1 is a block diagram showing the configuration of a CATV system of a first embodiment.

First Embodiment

As shown in FIG. 1, this CATV system has a communication facility 40 (hereinafter, referred to as a "CATV center station 40"), a set-top box 1 (hereinafter, referred to as a "STB 1") as a cable communication apparatus, an external processing apparatus 42 (hereinafter, referred to as an "external apparatus 42") such as, for example, a computer, a power supply apparatus 43, and a television receiving apparatus 44 (hereinafter, referred to as a "television 44").

The CATV center station 40 is installed in a center station of cable television.

The STB 1 is connected to the CATV center station 40 via a CATV trunk line 41.

The external apparatus 42 is connected to the STB 1 via a local area network (hereinafter, referred to as a "LAN") or the like.

The power supply apparatus 43 supplies power to the components in the STB 1. The power supply apparatus 43 is, for example, an AC/DC adaptor or the like.

The power supply apparatus 43 is connected to a RF output terminal of the STB 1 via a coaxial cable or the like.

The STB 1 has a diplexer 11 as a branching filter, a signal level adjusting unit 30 (for example, a variable attenuator shown in FIG. 2, a variable amplifier shown in FIG. 3, or the like) as a gain adjusting unit, a splitter 12, a tuner 2 as a receiving unit, a demodulating unit 3, a reception level notifying unit 10, and so on.

The reception level notifying unit 10 has a media access controller 15 (hereinafter, referred to as a "MAC 15"), a modulating unit 7, a LAN interface 16 (hereinafter, referred to as a "LAN I/F 16") as a communication interface apparatus, a memory 17, a programmable gain amplifier 18 (hereinafter, referred to as a "PGA 18"), a CPU 19, and so on.

The diplexer 11 has a low pass filter and a high pass filter.

The low pass filter is a filter for sending, to the CATV trunk line 41, an upstream second RF signal (hereinafter, referred to as an "upstream signal") which is to be transmitted to the CATV center station 40.

The high pass filter is a filter guiding, to the internal circuit, a downstream first RF signal (hereinafter, referred to as a "downstream signal") which is sent from the CATV center station 40.

The high pass filter is also a filter preventing the upstream signal having passed through the low pass filter from entering the circuit after the signal level adjusting unit 30 of the inside of the apparatus.

When a downstream signal sent from the CATV center station 40 via the CATV trunk line 41 is inputted to a RF input terminal (not shown) of the STB 1, the diplexer 11 allows the passage of only a downstream signal band prescribed by a CATV company for its operation to output the downstream signal to the signal level adjusting unit 30.

The diplexer 11 allows the passage of only an upstream signal band prescribed by the CATV company for its operation to send the upstream signal generated in the STB 1 to the CATV center station 40 from a RF connector (not shown) via the CATV trunk line 41.

That is, the diplexer 11 branches (or separates) the downstream signal sent via the CATV trunk line 41 and the upstream signal which is to be sent to the CATV trunk line 41 and is in a frequency band different from a frequency band of the downstream signal, according to the respective frequency bands, and outputs these signals in the respective directions.

The use of the upstream signal is standardized as, for example, in the United States, a 42 MHz frequency band or lower. In the Japan, it is standardized as a 50 MHz frequency band or lower, and for example, in Europe, it is standardized as a 65 MHz frequency band or lower. The use of the downstream signal, for example, in the United States and Japan, is standardized as a 90 MHz frequency band or higher, and on the other hand, in Europe, it is standardized as a 108 MHz frequency band or higher.

According to the switching of a switch by a manual operation or according to the control by the CPU 19 or the television 44, the signal level adjusting unit 30 directly outputs (bypasses) a downstream signal inputted via the diplexer 11, or adjusts a gain of the downstream signal by attenuating or amplifying the downstream signal by a predetermined (known) attenuation or amplification amount. Here, "predetermined amount" refers to a value stored in the memory 17 in advance.

That is, the signal level adjusting unit 30 adjusts (varies) the gain of the downstream signal received via the diplexer 11, upon receiving the control from the CPU 19 or the television 44, or a manual operation by an operator.

The downstream signal gain-adjusted by the signal level adjusting unit 30 is distributed to a plurality of lines (two lines in this example) by the splitter 12, and the downstream signal of one of the lines is outputted to the tuner 2, and the downstream signal of the other line is outputted to the external television 44.

Incidentally, the number of lines to which the splitter 12 distributes the downstream signal is not limited to the number in this embodiment but may be three, four, or more.

Figure 2:
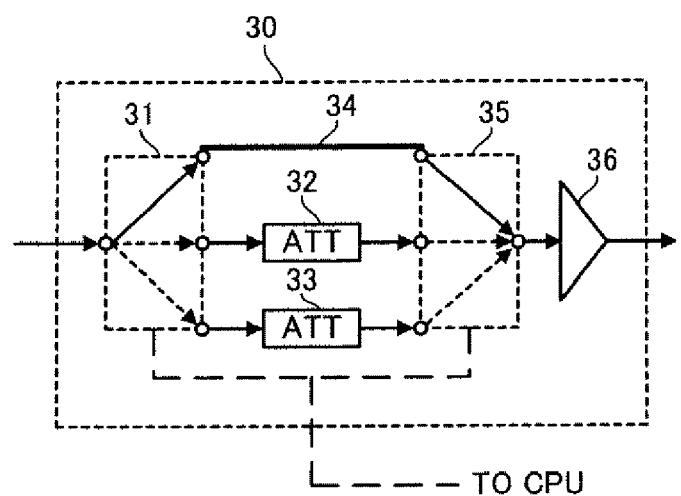
FIG. 2 is a diagram showing an example where a signal level adjusting unit of a STB is constituted by a step attenuator.
Figure 3:
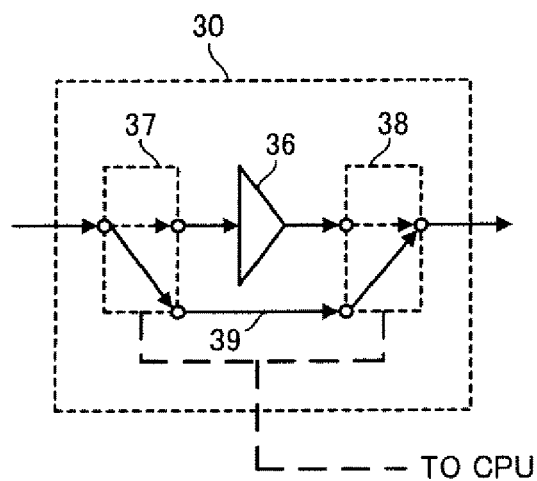
FIG. 3 is a diagram showing an example where the signal level adjusting unit of the STB is constituted by a switchable amplifier.

Examples of the concrete configuration of the signal level adjusting unit 30 are shown in FIG. 2 and FIG. 3, and will be described later.

The splitter 12 distributes the downstream signal outputted from the signal level adjusting unit 30, to the tuner 2 of a cable modem circuit part and to another receiving unit, in this case, the television 44 connected to a RF output terminal (not shown) of the STB 1.

That is, the splitter 12 two-divides the inputted downstream signal into a RF signal which is to be sent to the RF output terminal (not shown) connected to the television 44 and a RF signal which is to be sent to the tuner 2 on an internal cable modem circuit side.

In other words, the splitter 12 distributes the downstream signal gain-adjusted by the signal level adjusting unit 30, to the two lines, that is, divides the downstream signal into a downstream signal for television broadcast viewing and a downstream signal for data processing.

Incidentally, in this embodiment, the downstream signal is distributed to two lines, that is, divided into the downstream signal for television broadcast viewing and the downstream signal for data processing, but may be distributed to a plurality of lines for data processing.

For example, a downstream signal for data processing may be distributed to a plurality of lines only in the STB 1. That is, the way a downstream signal is distributed is not limited to the way in this embodiment.

The tuner 2 handles the downstream signal for data processing (radio-frequency signal), and has a RF automatic gain control circuit 23 (hereinafter, referred to as a "RF AGC 23"), a radio-frequency amplifier 24, a frequency converter 25, a local oscillator 26, a band pass filter 27 (hereinafter, referred to as a "BPF 27"), and so on.

The downstream signal inputted to the tuner 2 from the splitter 12 is inputted to the RF AGC 23. The RF AGC 23 is controlled by an AGC voltage inputted from a demodulator 5 to adjust an attenuation amount of the downstream signal inputted for data communication.

That is, here, the gain of the inputted downstream signal is re-adjusted for data communication. Then, the RF AGC 23 outputs to the radio-frequency amplifier 24 the downstream signal whose level is adjusted to a certain value.

The radio-frequency amplifier 24 amplifies the downstream signal to output the resultant downstream signal to the frequency converter 25. The local oscillator 26 is connected to the frequency converter 25.

The local oscillator 26 generates an oscillation signal for use in converting the frequency of a desired data communication signal in the downstream signal to an intermediate frequency and outputs the oscillation signal to the frequency converter 25.

The frequency converter 25 mixes the inputted oscillation signal and downstream signal and converts the frequency of the resultant signal to a desired intermediate frequency to output the frequency-converted signal to the BPF 27.

The BPF 27 cuts out unnecessary frequency bands except a necessary channel of the data communication reception signal, and outputs the resultant signal from the tuner 2 to the A/D converter 4 of the demodulating unit 3.

The tuner 2 automatically controls the gain of the downstream signal distributed for data processing by the splitter 12, and selects a channel for data processing from the gain-controlled downstream signal, and outputs an analog reception signal of the selected channel to the demodulating unit 3.

That is, the tuner 2 has the RF AGC 23 controlling the gain of the downstream signal of at least one line out of the plural lines to which the downstream signal is distributed by the splitter 12, and obtains the data processing reception signal from the downstream signal gain-controlled by the RF AGC 23.

The demodulating unit 3 has the A/D converter 4 and the demodulator 5. The A/D converter 4 converts the data communication signal outputted from the tuner 2 into a digital signal modulated by quadrature amplitude modulation (hereinafter, referred to as "QAM") or the like.

The demodulator 5, which is, for example, a QAM demodulator or the like, QAM-demodulates the digital signal outputted from the A/D converter 4 to take out data, and also detects the intensity of the data communication QAM signal to notify the detected intensity to the CPU 19.

That is, the demodulating unit 3 demodulates the analog reception signal of the channel selected by the tuner 2 to the digital data, and also outputs, to the RF AGC 23, a RF AGC voltage which depends on the reception state of the reception signal.

The MAC 15 has a data input/output terminal (not shown), and has a communication function of transmitting/receiving, to/from the external apparatus 42, data that the external apparatus 42 exchanges with the CATV center station 40.

The MAC 15 outputs the downstream data resulting from the demodulation by the demodulator 5, to the external apparatus 42 from the data input/output terminal via the LAN I/F 16. Signals between the LAN I/F 16 and the external apparatus 42 are converted to a format of the standard such as IEEE 802.3.

Further, the MAC 15, which controls the transmission and reception of digital data, outputs the downstream digital data to the external apparatus 42 and also sends upstream digital data to the modulator 8, according to the control from the CPU 19.

That is, the MAC 15 outputs, to the external apparatus 42, the digital data resulting from the demodulation by the demodulating unit 3, and also sends reception level notifying data (level report) generated by the CPU 19 to the modulating unit 7.

The modulating unit 7 has a modulator 8 and a D/A converter 9. The modulator 8 modulates the level report sent from the MAC 15 to a signal of a digital modulated wave such as QPSK or QAM.

The D/A converter 9 converts the digital signal modulated by the modulator 8 to an analog upstream signal, and outputs the analog upstream signal to the PGA 18. That is, the modulating unit 7 modulates the inputted level notifying data to an upstream signal.

The CPU 19 and the memory 17 control the operations and functions of the above-described components and are connected to the MAC 15.

In the memory 17, stored is a correspondence table (conversion table) showing a correspondence relation between information indicating the reception state of the data communication reception signal (signal intensity) and the level of the data communication reception signal.

Concretely, in the memory 17, stored is the correspondence table (conversion table) showing the correspondence relation between the RF AGC voltage and the level of the data communication reception signal.

In the memory 17, further stored are standard values of the reception level or the signal intensity of the received downstream signal.

In a case where, for example, a step attenuator shown in FIG. 2 is used as the signal level adjusting unit 30, a correction table showing switching states of switches 31, 35 (gain adjustment states) and level correction values of the downstream signal in correspondence to each other is stored in the memory 17.

For example, a first correction value corresponds to a case where the switches 31, 35 are switched to an ATT 32 side, and for example, a second correction value corresponds to a case where the switches 31, 35 are switched to an ATT 33 side, and so forth. For example, "no correction" corresponds to a case where the switches 31, 35 are switched to a bypass circuit 34 side.

In a case where, for example, a switchable amplifier shown in FIG. 3 is used as the signal level adjusting unit 30, a correction table stored in the memory 17 shows the switching states of switches 37, 38 (states of switches) and level correction values of the downstream signal in correspondence to each other.

According to the gain adjustment state of the signal level adjusting unit 30 (information on detected states of the switches which indicates the position of the switches 31, 35, 37, 38, etc. in FIG. 2 and FIG. 3, a path selected by these switches, or the like), the CPU 19 obtains the level correction value (for example, −1 dB, −2 dB, etc.) of the downstream signal, by referring to the correction table stored in advance in the memory 17.

According to the intensity of the reception signal (signal intensity) detected by the demodulator 5 and the level correction value, the CPU 19 generates the reception level notifying information (level report) which is to be sent to the CATV center station 40, and outputs the generated information to the MAC 15.

Specifically, according to the gain adjustment state of the signal level adjusting unit 30, the CPU 19 decides the level correction value by referring to the correction table stored in the memory 17.

The CPU 19 generates a control signal for adjusting a gain of an upstream signal so that the upstream signal has a transmission level designated from the CATV center station 40, and outputs the control signal to the PGA 18. The upstream signal transmission level is sent from the CATV center station 40, being included in digital data of the downstream signal.

Further, the CPU 19 finds the reception level of the downstream signal by collating the intensity of the reception signal (signal intensity) or the RF AGC voltage, which is obtained in the apparatus or externally obtained, with the correspondence table (conversion table) stored in advance in the memory 17. The intensity of the reception signal (signal intensity), the RF AGC voltage, and the like are referred to as information indicating the reception state of a reception signal.

The CPU 19 adds (arithmetically operates) the reception level of the reception signal having undergone the AGC and the level correction value in the RF stage to find the correct reception level of the reception signal, and notifies thus found correct reception level to the CATV center station 40 by superimposing the correct signal level on the upstream signal.

It should be noted that the correction table and the correspondence table (conversion table) do not necessarily have to be stored in the memory 17 in a table form, but the contents of the respective tables may be written on a program executed by the CPU 19 to be processed sequentially.

The PGA 18 is an analog amplifier capable of varying (adjusting) the level of an input signal by a variable width of, for example, about 50 dB to output it, according to external control (the control from the CPU 19 in this example). The input signal in this case refers to an upstream signal.

According to control information (instruction on by how many decibels the input signal should be increased or decreased for outputting) generated by the CPU 19, the PGA 18 adjusts the level of the upstream signal inputted from the D/A converter 9 and outputs the resultant upstream signal to the diplexer 11.

The PGA 18 adjusts the level of the upstream signal resulting from the modulation by the modulating unit 7, according to the control signal inputted from the CPU 19, and transmits the level-adjusted upstream signal to the CATV trunk line 41 via the diplexer 11 to notify the level to the CATV center station 40.

The reception level notifying unit 10 reads the level correction value of the downstream signal from the memory 17, according to the detected gain adjustment state of the signal level adjusting unit 30.

The reception level notifying unit 10 calculates the reception level of the reception signal by using the read level correction value of the first downstream signal and the information indicating the reception state of the reception signal (signal intensity or the like) which is outputted from the demodulator 5.

The reception level notifying unit 10 transmits the calculated reception level of the reception signal to the CATV center station 40 via the diplexer 11 and the CATV trunk line 41 by superimposing the reception level on the upstream signal.

For example, in a case where the level correction value in the signal level adjusting unit 30 is −2 dB (attenuation by 2 dB) and the reception level of the reception signal having gone through the RF AGC is 0 dB, the correct reception level of the reception signal is a value equal to the sum of the level correction value with the opposite sign (plus) and the reception level, that is, +2+0=+2 dB, and this value is notified.

Here, the signal level adjusting unit 30 will be described in detail.

As the signal level adjusting unit 30, one of a variable attenuator whose adjustment attenuates the level of the downstream signal, a variable amplifier whose adjustment is in an opposite direction, and a circuit in which they are combined is applicable.

For example, as shown in FIG. 2, the step attenuator includes the bypass circuit 34, the plural attenuators 32, 33 (hereinafter, referred to as "ATTs 32, 33") having known different attenuation amounts, and the switches 31, 35 switching a path of the downstream signal to one of the ATTs 32, 33 and the bypass circuit 34.

An amplifier 36 is connected on a subsequent stage of the step attenuator to constitute the signal level adjusting unit 30.

The bypass circuit 34 is a circuit bypassing the downstream signal, that is, a circuit bypassing the downstream signal so as not to have the downstream signal pass through the ATTs 32, 33, and is a circuit structured such that one contact of the switch 31 and one contact of the switch 35 are connected by a jumper cable.

The ATT 32 attenuates the level of the downstream signal by a first attenuation amount. The ATT 33 attenuates the level of the downstream signal by a second attenuation amount larger than the first attenuation amount.

The switches 31, 35 are RF switches and switch the path of the downstream signal to one of the ATTs 32, 33 and the bypass circuit 34. As the switches 31, 35, manual switches performing the circuit change according to a manual operation of an operator are used.

Examples of other switches used as the switches 31, 35 are controllable switches performing the circuit change according to the input of an on/off control signal and switches performing the circuit change according to a switch control command from a remote controller, the television 44, or the like.

A wiring cable from the CPU 19 is connected to the switches 31, 35, so that the CPU 19 side can detect the circuit change state.

The amplifier 36 is a wideband amplifier and amplifies the downstream signal sent through the circuit to which the path is switched by the switches 31, 35, by a predetermined gain to output the amplified downstream signal to the splitter 12.

That is, the amplifier 36 amplifies the downstream signal outputted from the path selected by the switches 31, 35.

The step attenuator shown in FIG. 2 includes the two attenuators as an example, but may include one attenuator or three attenuators or more.

Further, in this example, the downstream signal is bypassed or attenuated, but in the following example, the downstream signal is amplified or bypassed.

Specifically, as shown in FIG. 3, the signal level adjusting unit 30 in this case is constituted by a switchable amplifier including an amplifier 36 amplifying the downstream signal by a predetermined (known) amplification amount, a bypass circuit 39 bypassing the downstream signal, and switches 37, 38 switching a path of the downstream signal to one of the bypass circuit 39 and the amplifier 36.

The switches 37, 38 are RF switches. As the switches 37, 38, for example, manual switches performing the circuit change according to an operator's operation are used, similarly to the aforesaid switches 31, 35.

Besides, usable is an auto-change switch capable of performing the circuit change according to the input of a switch control command (on/off control signal) from, for example, a remote controller or the television 44.

In the example in FIG. 3, to obtain the same effect as that of the example in FIG. 2, a gain amount of the amplifier 36 needs to be stored in the memory 17 in advance since the path of the downstream signal is switched to a path passing through the amplifier 36 or a path bypassing the amplifier 36.

That is, the gain amount of the amplifier 36 needs to be known.

To be more specific, the gain amount of the amplifier 36 is desirably set in the memory 17 in advance, with accuracy that the DOCSIS defines as necessary for notifying the level of the data communication reception signal, for example, with accuracy sufficiently higher than, for example, ±3 dB.

The signal level adjusting unit 30 is thus constituted by the switchable amplifier including the RF switches 37, 38 switching the path between the amplifier 36 and the bypass circuit 39, and the CPU 19 corrects the level of the data communication reception signal by using again amount of the switchable amplifier which depends on the state of the switches (bypass or amplification) detected from the switchable amplifier.

By the above-described operation, it is possible to find the correct level of the data communication reception signal.

Incidentally, the above examples in FIG. 2 and FIG. 3 describe the switchable attenuator and amplifier utilizing the switches, but besides, those capable of stepless variation by volume or the like may be utilized, for instance.

The signal level adjusting unit 30 may be the combination of the amplifier, the bypass circuit, and the attenuators as is obtained by combining the examples in FIG. 2 and FIG. 3.

Next, the operation of the CATV system of the first embodiment will be described. Generally, in CATV operation, the level of data communication signals is often set lower than the level of TV signals in order to prevent the data communication signals from deteriorating reception quality of the TV signals.

Further, in the CATV system, the number of TV signals transmitted is far larger than the number of data communication signals because its feature is multi-channel. Further, data communication signals are often inserted between conventionally existing TV signals in a frequency axis direction.

From a viewpoint of performance of a downstream signal receiving circuit as a cable modem, this means that the level and total power of the unnecessary TV signals are larger than those of necessary data communication signals, and also means that near the necessary data communication signals, the higher-level TV signals exist.

In such a downstream signal reception environment, especially when the total power of all the downstream signals are excessively high, if the downstream signals are amplified by the amplifier 36 of the signal level adjusting unit 30, large signal distortion occurs.

In a case where a reception signal consists of a single signal sent only for data communication, the reception signal, even with the level not causing the distortion, is distorted due to the excessively high level of all the downstream signals including the TV signals, resulting in the deterioration in reception quality of the data communication signal.

For example, in a case where the signal level adjusting unit 30 of the CATV system in FIG. 1 is constituted by the step attenuator shown in FIG. 2, by causing the downstream signal to pass through the ATT 32 or the ATT 33, it is possible to prevent the excessively high level of the downstream signals from being inputted to the amplifier 36 and prevent the deterioration in reception quality due to distortion performance of the amplifier 36.

Meanwhile, as described above, in order to be DOCSIS compliant, the STB 1 needs to have the function of notifying the CATV center station 40 of the level of a data communication reception signal with a certain range of accuracy.

To realize this notifying function, it is necessary to obtain the level of the data communication reception signal in the circuit.

For example, when controlling the RF AGC 23, the demodulator 5 outputs the RF AGC voltage constantly behaving in the same manner relative to the level of the data communication reception signal, and therefore, this RF AGC voltage may be inputted to the CPU 19 so as to serve as a basis of the detection of the level of the reception signal. Alternatively, information indicating signal intensity of the reception signal may be outputted from the demodulator 5 to the CPU 19.

In this case, the CPU 19 finds the level of the data communication reception signal from the correspondence table (conversion table), which is stored in the memory 17 in advance, showing the correspondence relation between the RF AGC voltage and the level of the data communication reception signal, and while controlling the attenuation amount of the step attenuator according to the found level of the reception signal, the CPU 19 notifies the CATV center station 40 of the reception level of the downstream signal, which level is obtained by adding the found level of the reception signal and the level correction value corresponding to the attenuation amount of the step attenuator.

For this purpose, level correction values corresponding to the attenuation amounts of the step attenuator shown in FIG. 2, for instance, need to be stored in advance in the memory 17 so as to be readable by the CPU 19.

More specifically, it is desirable that accuracy of the step attenuator is set sufficiently higher than accuracy that the DOSIS defines as necessary for the notification of the level of the data communication reception signal, for example, higher than ±3 dB, and a value by which the signal is attenuated is set to a known value, that is, a correspondence table (correction table) of switching positions of the switches 31, 35 and attenuation amounts of the ATTs 32, 33 is set in the memory 17 in advance.

Since the CPU 19 corrects the level of the data communication reception signal calculated from the signal intensity or the RF AGC voltage, by using an attenuation amount (level correction value) of the step attenuator stored in advance in the memory 17, it is possible to find the correct level of the data communication reception signal.

According to the CATV system of the first embodiment, in a case where the STB 1 receives from the CATV trunk line 41 a RF signal including a TV signal and a data communication signal and internally separates these signals to output them, the CPU 19 detects the level adjustment state of the signal level adjusting unit 30, and finds the level correction value of the downstream signal according to the detected level adjustment state, thereby capable of finding the correct level of the data communication reception signal from the found level correction value and the signal intensity (may be the RF AGC voltage or the like) derived from the reception signal.

Further, since the level report indicating the found correct reception level of the downstream signal is notified to the CATV center station 40 by means of the upstream signal, it is possible to satisfy the technical specification of the DOCSIS.

Second Embodiment

Next, a second embodiment will be described with reference to FIG. 4. In the second embodiment, the same reference numerals and symbols are used to designate the same elements as those of the above-described embodiment, and description thereof will be omitted.

Figure 4:
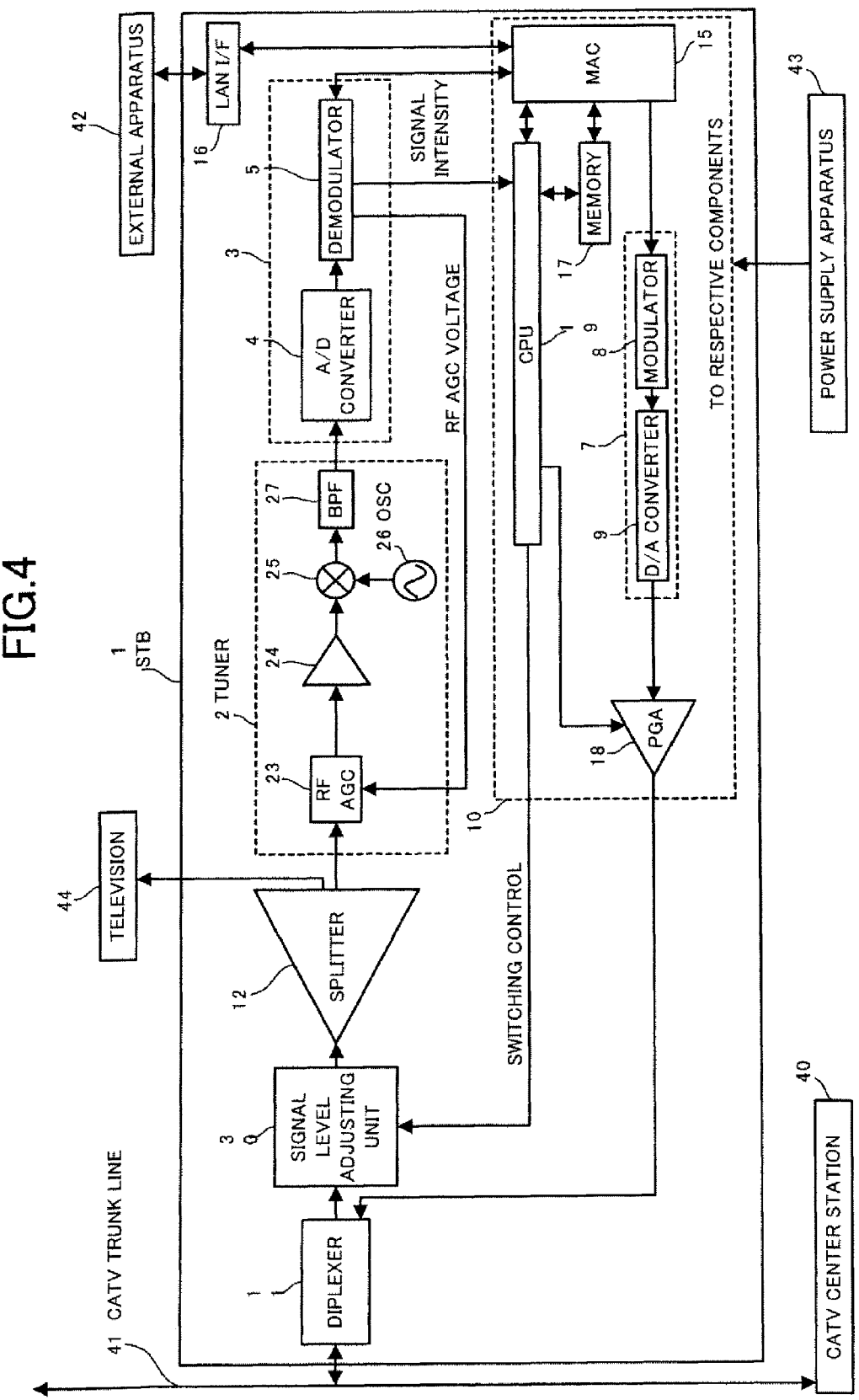
FIG. 4 is a diagram showing the configuration of a CATV system of a second embodiment.

As shown in FIG. 4, in the second embodiment, a reception level notifying unit 10 is configured to control a signal level adjusting unit 30 so that the signal level adjusting unit 30 has a gain adjustment state decided according to a reception level of a reception signal.

Concretely, a CPU 19 outputs a control signal to the signal level adjusting unit 30 so that the signal level adjusting unit 30 has the gain adjustment state decided according to the detected reception level of the reception signal, whereby the CPU 19 itself controls the gain adjustment of the signal level adjusting unit 30.

Since the CPU 19 thus outputs the control signal to the signal level adjusting unit 30, it is possible to adjust a gain of a downstream signal to a proper value without any manual operation or external control for switching the switches 31, 35, 37, 38 shown in FIG. 2 and FIG. 3.

In the second embodiment, the CPU 19 collates a RF AGC voltage (information indicating the reception state of a reception signal), which is obtained in the apparatus or externally obtained, with a correspondence table (conversion table) set in advance in a memory 17, to find the reception level of the reception signal, and outputs the control signal for gain adjustment to the signal level adjusting unit 30 according to the found reception level of the reception signal.

According to the second embodiment, by the CPU 19 itself controlling a signal attenuation amount or a signal amplification amount (gain amount) of the signal level adjusting unit 30, it is possible to correct the level of a downstream signal to a proper value and to find the correct level of a data communication reception signal, as in the first embodiment.

Incidentally, a gain adjustment state (to which position the switches 31, 35, 37, 38, etc. in FIG. 2 and FIG. 3 are switched, to which path the switches 31, 35, 37, 38, etc. are switched, or the like) obtained by monitoring the signal level adjusting unit 30 may be detected, as in the above-described first embodiment.

Third Embodiment

Figure 5:
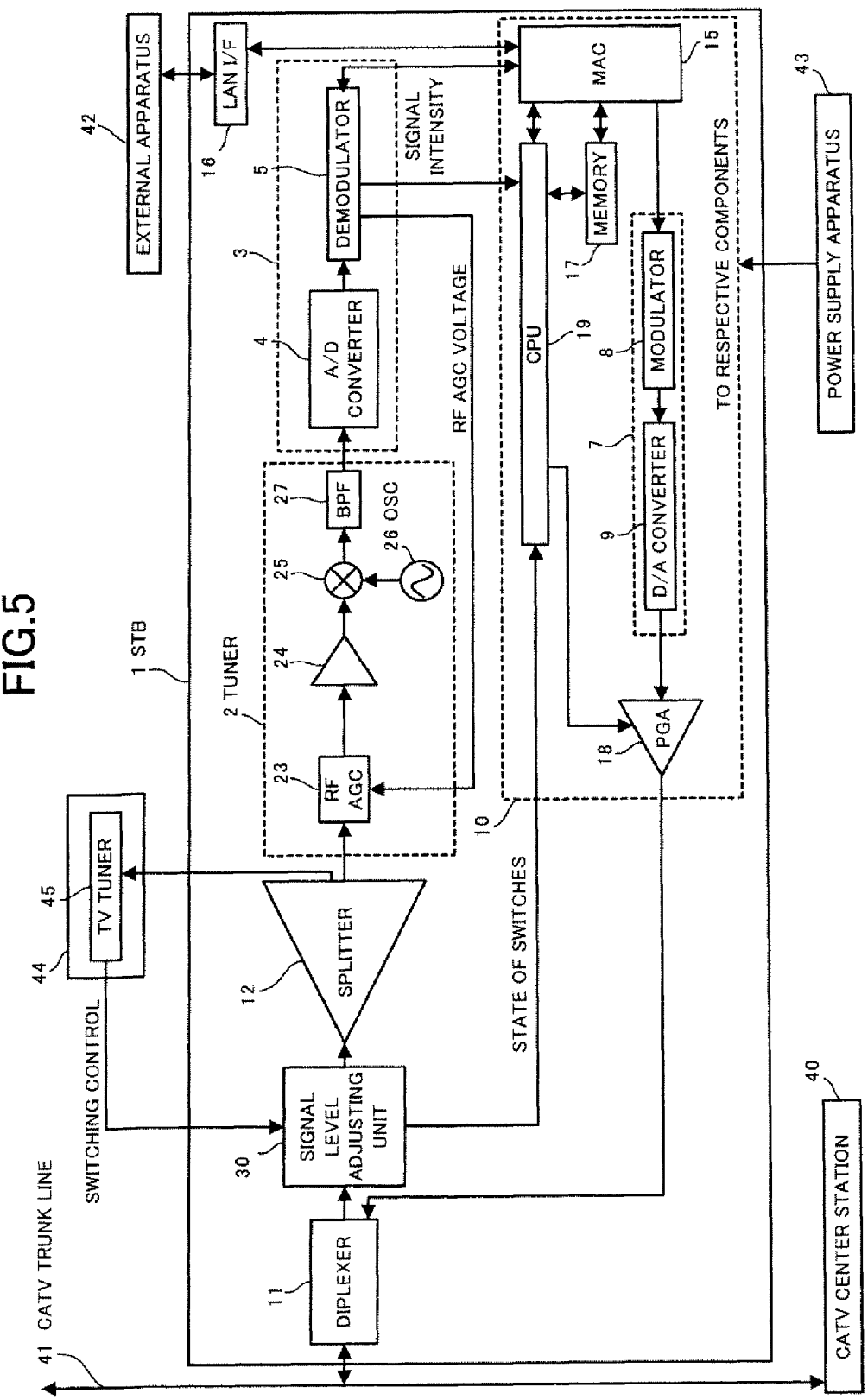
FIG. 5 is a diagram showing the configuration of a CATV system of a third embodiment.

Next, a third embodiment will be described with reference to FIG. 5. In the third embodiment, the same reference numerals and symbols are used to designate the same elements as those of the above-described embodiments, and detailed description thereof will be omitted.

In the third embodiment, a downstream signal of another line out of a plurality of lines to which a downstream signal is distributed by a splitter 12 is outputted from a RF output terminal (not shown) of a STB 1 to an external part, in this example, to a television 44. The television 44 has a television tuner 45 (hereinafter, referred to as a "TV tuner 45"). The TV tuner 45 generates a video signal for television broadcast viewing from the inputted downstream signal. The TV tuner 45 has substantially the same configuration as that of the internal tuner 2, and therefore generally includes a RF AGC circuit.

Therefore, in this example, a signal level adjusting unit 30 receives, as a control signal for changing the switching state of the switches, a RF AGC voltage that a demodulator in the television 44 outputs in order to control the RF AGC circuit when a television broadcast is viewed through the television 44, and based on the control signal, gain-adjusts the downstream signal. Further, a reception level notifying unit 10 monitors the signal level adjusting unit 30 to detect a gain adjustment state of the signal level adjusting unit 30.

That is, the television 44 outputs the control signal to the signal level adjusting unit 30 to control the switching state of the switches of the signal level adjusting unit 30, and based on the control signal, the gain of the downstream signal is adjusted.

In other words, the signal level adjusting unit 30 performs the gain adjustment according to the control by the television 44 receiving a downstream signal of one line out of the plural lines to which the downstream signal is distributed by the splitter 12.

Further, the CPU 19 monitors the signal level adjusting unit 30 to detect the state of the switches of the signal level adjusting unit 30, thereby finding a level correction value.

Here, a description will be given of a concrete method of controlling the signal level adjusting unit 30 by the control signal from the television 44.

The RF AGC circuit built in the TV tuner 45 is controlled by the RF AGC voltage which depends on the level of the input to the TV tuner 45, and therefore, by detecting the RF AGC voltage, it is possible to detect the level of a reception signal for TV viewing inputted to the TV tuner 45.

In a case where the signal level adjusting unit 30 is constituted by, for example, the step attenuator shown in FIG. 2 and the RE AGC circuit of the TV tuner 45 is a reverse AGC circuit controlled by the RF AGC voltage in inverse proportion to the level of the received reception signal for TV viewing, the reverse AGC circuit uses the inputted RF AGC voltage as one parameter. For example, when the RF AGC voltage is equal to or higher than a first threshold value which is set in advance, the reverse AGC circuit outputs the control signal for switching a path of the downstream signal to a bypass circuit 34 side, to the switches 31, 35 of the step attenuator and as a result, the downstream signal bypasses the ATTs 32, 33 in the step attenuator.

Further, in a case where the inputted RF AGC voltage is lower than the first threshold value, the control signal causing the downstream signal to pass through the ATT 32 is outputted to the switches 31, 35 of the step attenuator, so that a predetermined attenuation amount is obtained.

Further, in a case where the inputted RF AGC voltage is equal to or lower than a second threshold value set lower than the first threshold value, the control signal causing the downstream signal to pass through the ATT 33 is outputted to the switches 31, of the step attenuator, so that a larger attenuation amount can be obtained.

The relation of the attenuation amounts in this case is ATT 32<ATT 33. As a result of such an operation, the level of the downstream signal inputted to the amplifier 36 is decreased in stages when the downstream signal to be inputted to the amplifier 36 has an excessively high downstream signal level exceeding its tolerable distortion performance, which makes it possible to prevent deterioration in its performance.

The CPU 19 finds a level correction value corresponding to an attenuation amount of the downstream signal by utilizing a switching state of the switches of the step attenuator (attenuation amount adjustment state) that the CPU 19 detects while monitoring the signal level adjusting unit 30, and corrects the reception level of the data communication reception signal, thereby capable of finding the correct level of the data communication reception signal.

Further, in a case where the signal level adjusting unit 30 is constituted by, for example, the switchable amplifier shown in FIG. 3, the TV tuner 45 of the television 44 outputs control information to the switches 37, 38 to control the switching of a path of the signal, and causes the downstream signal to pass through or bypass the amplifier 36.

Utilizing the RF AGC voltage of the TV tuner 45 as is utilized in the aforesaid step attenuator is one example of a method of this case.

In this case, the TV tuner 45 controls the switches 37, 38 so as to cause the downstream signal to pass through the amplifier 36 when the RF AGC voltage is equal to or higher than a certain threshold value, while controlling the switches 37, 38 so as to cause the downstream signal to bypass the amplifier 36 when the RF AGC voltage is lower than the threshold value.

As a result of such an operation, when the downstream signal to be inputted to the amplifier 36 has an excessively high signal level exceeding its tolerable distortion performance, the downstream signal is bypassed so as not to pass through the amplifier 36, and as a result, deterioration in its performance can be prevented.

According to the third embodiment, by the television 44 controlling a signal attenuation amount or a signal amplification amount (gain amount) of the signal level adjusting unit 30, it is possible to correct the level of a downstream signal to a proper value and to find the correct level of a data communication reception signal to notify it to the CATV center station 40, as in the first embodiment and the second embodiment.

Incidentally, the above third embodiment shows the television 44 as an example of an externally controlling apparatus, but other remote control apparatus may be used. Possible examples of the remote control apparatus are a wireless remote controller and so on.

Fourth Embodiment

Figure 6:
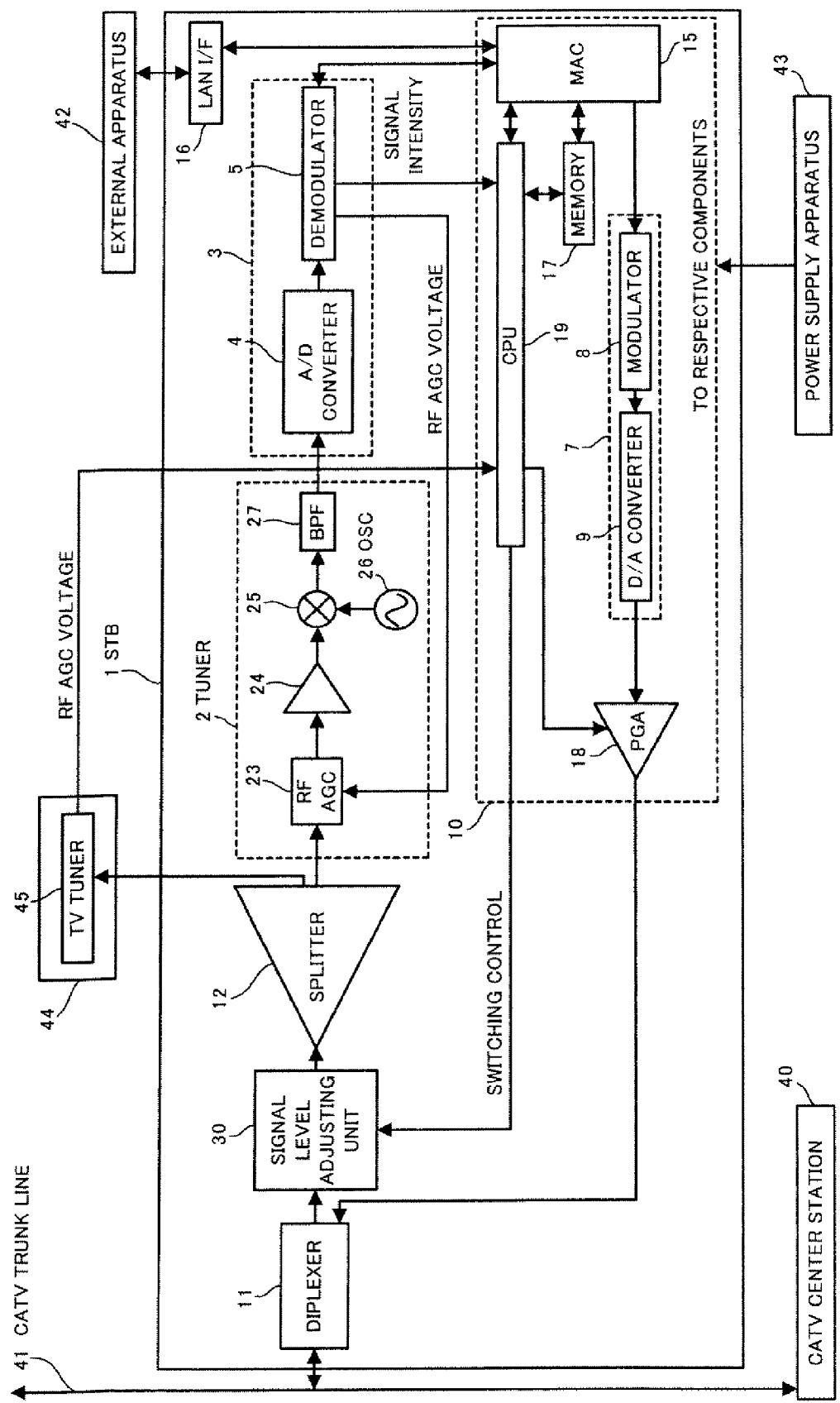
FIG. 6 is a diagram showing the configuration of a CATV system of a fourth embodiment.

Next, a fourth embodiment will be described with reference to FIG. 6. In the fourth embodiment, the same reference numerals and symbols are used to designate the same elements as those of the above-described embodiments, and description thereof will be omitted.

The fourth embodiment is a modification example of the third embodiment. A TV tuner 45 has substantially the same configuration as that of an internal tuner 2, and therefore generally includes a RF AGC circuit.

Therefore, in this example, as control information for changing switching states, a CPU 19 in a STB 1 receives a RF AGC voltage which is inputted from a demodulator or the like in the television 44 to the RF AGC circuit when a television broadcast is viewed through the television 44, and outputs a control signal for controlling the switching state of the switches to a signal level adjusting unit 30 according to the inputted RF AGC voltage. Then based on the control signal, the downstream signal is gain-adjusted.

That is, in the fourth embodiment, the control information for controlling the signal level adjusting unit 30 is transmitted from the TV tuner 45 of the television 44 to the CPU 19, and the CPU 19 itself controls an attenuation amount or an amplification amount of the signal level adjusting unit 30.

To indirectly control the signal level adjusting unit 30 by using the control information from the television 44, the CPU 19 uses, as the control information, the RF AGC voltage sent from the TV tuner 45 as in the third embodiment, for instance, and the CPU 19 controls the signal level adjusting unit 30 based on this information.

That is, the CPU 19 outputs the control signal for adjusting the signal level to the signal level adjusting unit 30 according to the RF AGC voltage (control information) obtained from the television 44 and controls the attenuation amount or the amplification amount of the signal level adjusting unit 30. Consequently, it is possible to correct the attenuation amount or the amplification amount of the downstream signal and to find the correct level of the data communication reception signal, as in the first embodiment.

According to the fourth embodiment, the control information for controlling the gain adjustment of the signal level adjusting unit 30 is transmitted from the television 44 to the CPU 19, and the CPU 19 itself controls the attenuation amount or the amplification amount of the signal level adjusting unit 30, which makes it possible to correct the level of the downstream signal to a proper value and to find the correct level of the data communication reception signal to notify it to the CATV center station 40, as in the first embodiment to the third embodiment.

Incidentally, in this example, the CPU 19 controls the gain adjustment of the signal level adjusting unit 30 according to the RF AGC voltage supplied from the television 44, but as other information indicating the reception state of the reception signal, information indicating the reception state of a television signal received by the television 44, for example, information such as a CN value (value of a carrier signal-tonoise ratio) and BER (Bit Error Rate) obtained when a digital broadcast is received may be inputted to the CPU 19.

That is, any of various information indicating the reception state of the reception signal is usable as the control information for the gain adjustment of the signal level adjusting unit 30.

Fifth Embodiment

Figure 7:
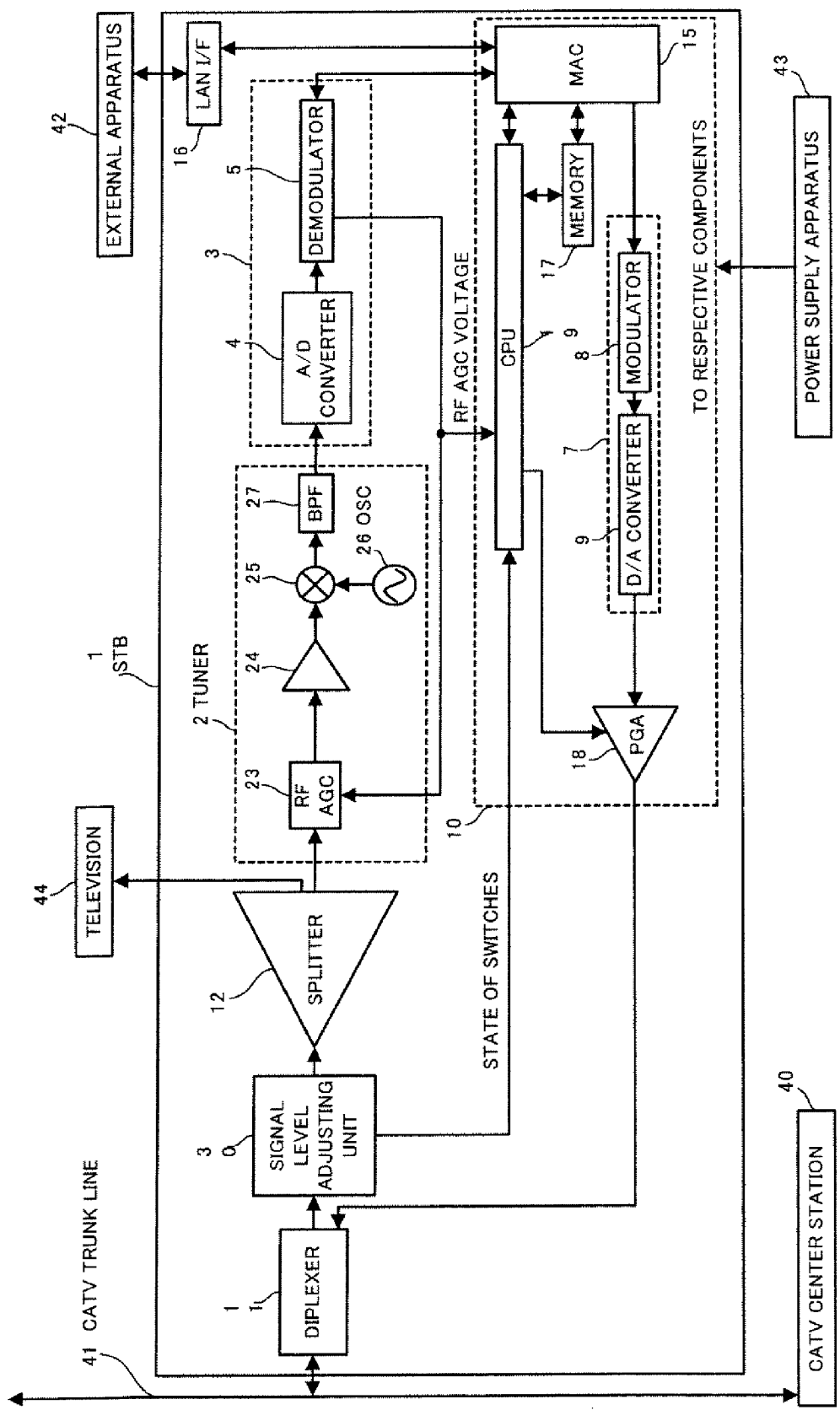
FIG. 7 is a diagram showing the configuration of a CATV system of a fifth embodiment.

Next, a fifth embodiment will be described with reference to FIG. 7. In the fifth embodiment, the same reference numerals and symbols are used to designate the same elements as those of the above-described embodiments.

In the above-described embodiments, the CPU 19 obtains the signal intensity outputted from the demodulator 5 to control the signal level adjusting unit 30, but in the fifth embodiment, a RF AGC voltage that a demodulating unit 3 outputs to control a RF AGC 23 is branched, and the CPU 19 obtains the RF AGC voltage branched in one direction to control a signal level adjusting unit 30.

Here, as a method for the CPU 19 to control the signal level adjusting unit 30 based on the RF AGC voltage controlling the RF AGC circuit 23, various methods are conceivable.

Let us consider a case where, for example, the step attenuator shown in FIG. 2 is applied to the signal level adjusting unit 30 and a reverse AGC circuit controlled by the RF AGC voltage in reverse proportion to the level of a received data communication reception signal is applied to the RF AGC 23.

In this case, the CPU 19 compares the RF AGC voltage obtained from the demodulating unit 3 with a first reference voltage value stored in advance, and when the RF AGC voltage exceeds the first reference voltage value stored in advance, that is, when the level of the data communication reception signal is lower than a first reference level value, the CPU 19 controls the switching state of the switches 31, 35 of the step attenuator so as not to allow a downstream signal to pass through the ATTs 32, 33. That is, the downstream signal is bypassed.

Further, when the RF AGC voltage is equal to or lower than the first reference voltage value, that is, the level of the data communication reception signal is equal to or higher than the first reference level value, and also the RF AGC voltage exceeds a second reference voltage value, that is, the level of the data communication reception signal is lower than a second reference level value, the CPU 19 controls the switching state of the switches 31, 35 of the step attenuator so as to cause the downstream signal to pass through the ATT 32.

Further, when the RF AGC voltage is equal to or lower than the second reference voltage value, that is, when the level of the data communication reception signal is equal to or higher than the second reference level value, the CPU 19 controls the switching state of the switches 31, 35 of the step attenuator so as to cause the downstream signal to pass through the ATT 33.

Further, in a case where the switchable amplifier shown in FIG. 3, for instance, is applied to the signal level adjusting unit 30, the CPU 19 controls the switches 37, 38 based on the RF AGC voltage outputted from the demodulating unit 3 and controls the switches 37, 38 so as to cause the downstream signal to pass through or bypass the amplifier 36.

In this case, the CPU 19 stores a certain threshold value (voltage value) in the memory 17 in advance, for instance, and compares the obtained RF AGC voltage with the threshold value stored in advance, and controls the switching state of the switches 37, 38 so as to cause the downstream signal to pass through the amplifier 36 when the RF AGC voltage is equal to or higher than the threshold value.

On the other hand, when, as a result of the comparison, the RF AGC voltage is lower than the certain threshold value, the CPU 19 controls the switching state of the switches 37, 38 so as to cause the downstream signal to bypass the amplifier 36.

As a result of such an operation, when the downstream signal to be inputted to the amplifier 36 has an excessively high level exceeding its tolerable distortion performance, the downstream signal is caused to bypass the amplifier 36, which can prevent deterioration in its performance.

When the detected state of the switches 37, 38 shows that the downstream signal passes through the amplifier 36, the CPU 19 reads a corresponding level correction value by referring to the correction table stored in the memory 17, and corrects a reception level of the reception signal in consideration of a gain amount of the amplifier 36, thereby capable of finding the correct reception level of the data communication reception signal.

According to the fifth embodiment, since the CPU 19 obtains one RF AGC voltage which is branched from the RF AGC voltage outputted from the demodulating unit 3 to the RF AGC 23, to control the signal level adjusting unit 30, it is possible to prevent the input of the excessively high level of the downstream signal to the amplifier 36 to prevent deterioration in reception quality due to distortion performance of the amplifier 36, as in the first to fourth embodiments.

Further, in a case where the step attenuator is applied to the signal level adjusting unit 30, since the switching state of the step attenuator is controlled in stages, it is possible to quantitatively find the attenuation amount of the downstream signal, and therefore, by correcting the level of the reception signal having undergone the RF AGC by using this value as the level correction value, it is possible to find the correct level of the downstream signal.

Further, in a case where the switchable amplifier is applied to the signal level adjusting unit 30, since the switching state of the switches 37, 38 is controlled so that the downstream signal passes through or bypasses the amplifier 36, based on the RF AGC voltage outputted from the demodulating unit 3, it is possible to quantitatively find the level of the downstream signal.

Therefore, by correcting the level of the reception signal having undergone the RF AGC by using this value as the level correction value, it is possible to find the correct level of the downstream signal.

That is, in a case where the input level of the downstream signal is high and the downstream signal would be distorted if it should pass through the amplifier 36, the switchable amplifier does not allow the downstream signal to pass through the amplifier 36, and even in a case where the level of the downstream signal is thus adjusted by the signal level adjusting unit 30, it is possible to find the correct level of the data communication reception signal to notify it to the CATV center station 40.

As described above, according to the above-described embodiments, it is possible to gain-adjust a signal in a RF stage, receive the high-quality data communication signal separated from the signal, and notify the correct level of the data communication reception signal to the CATV center station 40 as is prescribed by the DOCSIS.

It should be noted that the present invention is not limited to the above-described embodiments, but in implementing the present invention, the constituent elements may be modified within a range not departing from the spirit of the present invention.

Further, various inventions can be configured by appropriate combination of a plurality of the constituent elements disclosed in the above-described embodiments.

For example, some constituent elements may be deleted from all the constituent elements shown in the embodiments. Further, constituent elements of different embodiments may be appropriately combined.

In the above-described embodiment, the step attenuator in FIG. 2, the switchable amplifier in FIG. 3, and the like are shown as concrete examples applied to the signal level adjusting unit 30 of the first embodiment, but it goes without saying that these configurations are applicable to all of the second to fifth embodiments.

In the third and fourth embodiments described above, the RF AGC voltage outputted from the TV tuner 45 in the television 44 connected to the splitter 12 is the control signal (control information), but other possible structures may be to provide an output signal level detector detecting the level of an output signal outputted from the amplifier 36 or the splitter 12, and automatically control an attenuation amount or an amplification amount of the signal level adjusting unit 30 according to the level of the output signal detected by the output signal level detector, or to control the attenuation amount or the amplification amount by using an operation from an external part of the STB 1, for example, by using a manual switch, a remote controller, a video signal from a television, or the like.

Concretely, in a case where the output signal level detector detecting the level of the output signal outputted from the amplifier 36 or the splitter 12 is provided, a control technique in Japanese Patent Publication No. 3249224 or the like is used.

An example of the manual switch switching the state of the signal level adjusting unit 30 is a switch capable of artificially switching the state according to an operation that a viewer performs while seeing the reception state of the television 44, such as for example, an amount of screen noise and interference stripes of the screen.

An example of the remote controller is a remote controller capable of artificially switching the state according to a button operation that a viewer performs while seeing the reception state of the television 44, such as for example, interference stripes of the screen, similarly to the aforesaid manual switch.

The above embodiments have described the configuration where the power supply apparatus 43 and the external apparatus 42 are provided outside the STB 1 and the STB 1 is connected to the television 44, but these may be configured as one hardware, or hardware may be configured by selectively combining some of the elements.

That is, a computer having a built-in cable modem, a television having a built-in cable modem, a tuner having a built-in cable modem, and the like are also included in the application range of the present invention. Further, a plurality of tuners for data reception and for video may be provided in the STB 1.

Other Embodiment

Embodiments of the present invention are not limited to the above-described embodiments, but the above-described embodiments can be expanded and modified, and the expanded and modified embodiments are also included in the technical range of the present invention.

What is claimed is:

1. A cable communication apparatus, comprising:
a branching filter branching a downstream first RF signal sent from a CATV network and an upstream second RF signal which is in a frequency band different from a frequency band of the first RF signal, according to the frequency bands;
a gain adjusting unit adjusting a gain of the first RF signal received through the branching filter, upon receiving a control or an operation;
a splitter distributing the first RF signal gain-adjusted by the gain adjusting unit to a plurality of lines;
a receiving unit having an auto gain control circuit controlling a gain of the first RF signal of at least one line out of the plural lines to which the first RF signal is distributed by the splitter, and obtaining a data processing reception signal from the signal gain-controlled by the auto gain control circuit;
a memory storing gain adjustment states of the gain adjusting unit and level correction values of the first RF signal in correspondence to each other; and
a reception level notifying unit calculating a reception level of the reception signal by using the level correction value of the first RF signal, which is read from the memory according to the gain adjustment state of the gain adjusting unit, and information indicating a reception state of the reception signal, and transmitting the calculated reception level on the CATV network through the branching filter by the second RF signal.

2. The cable communication apparatus as set forth in claim 1,
wherein the gain adjusting unit comprises:
an attenuator attenuating the first RF signal by a predetermined attenuation amount;
a bypass circuit bypassing the first RF signal;
a switch switching a path of the first RF signal to one of the bypass circuit and the attenuator; and
an amplifier amplifying the first RE signal outputted from the path selected by the switch.

3. The cable communication apparatus as set forth in claim 1,
wherein the gain adjusting unit comprises:
an amplifier amplifying the first RF signal by a predetermined amplification amount,
a bypass circuit bypassing the first RF signal; and
a switch switching a path of the first RF signal to one of the bypass circuit and the amplifier.

4. The cable communication apparatus as set forth in claim 1,
wherein the gain adjusting unit performs the gain adjustment according to control from another receiving unit receiving the first RF signal of one line out of the plural lines to which the first RF signal is distributed by the splitter.

5. The cable communication apparatus as set forth in claim 1,
wherein the reception level notifying unit monitors the gain adjusting unit to detect the gain adjustment state of the gain adjusting unit.

6. The cable communication apparatus as set forth in claim 1,
wherein the information indicating the reception state of the reception signal is an auto gain control voltage outputted from a demodulator which has demodulated the reception signal.

7. The cable communication apparatus as set forth in claim 1,
wherein the information indicating the reception state of the reception signal is one of an auto gain control voltage, information indicating a carrier signal-to-noise ratio, and a bit error rate which are outputted from another receiving unit receiving the first RF signal of one line out of the plural lines to which the first RF signal is distributed by the splitter.

8. The cable communication apparatus as set forth in claim 1,
wherein the reception level notifying unit controls the gain adjusting unit so as to cause the gain adjusting unit to have the gain adjustment state decided according to the reception level of the reception signal.

9. The cable communication apparatus as set forth in claim 6,
wherein the reception level notifying unit controls the gain adjusting unit so as to cause the gain adjusting unit to have the gain adjustment state decided according to the reception level of the reception signal.

10. The cable communication apparatus as set forth in claim 7,
wherein the reception level notifying unit controls the gain adjusting unit so as to cause the gain adjusting unit to have the gain adjustment state decided according to the reception level of the reception signal.

11. A cable communication method, comprising:
branching a downstream first RF signal sent from a CATV network;
adjusting, by a gain adjusting unit, a gain of the first RF signal upon receiving a control or an operation;
distributing the gain-adjusted first RF signal to a plurality of lines;
obtaining a data processing reception signal from a signal resulting from auto gain control of the first RF signal of at least one line out of the plural lines to which the first RF signal is distributed;
storing, in a memory, gain adjustment states of the gain adjusting unit and level correction values of the first RF signal in advance in correspondence to each other;
calculating a reception level of the reception signal by using the level correction value of the first RF signal, which is read from the memory according to the gain adjustment state of the gain adjusting unit, and information indicating a reception state of the reception signal; and
transmitting the calculated reception level of the reception signal on the CATV network by an upstream second RF signal which is in a frequency band different from a frequency band of the first RF signal.

12. The cable communication method as set forth in claim 11,
wherein the information indicating the reception state of the reception signal is an auto gain control voltage outputted from a demodulator which has demodulated the reception signal.

13. The cable communication method as set forth in claim 11,
wherein the information indicating the reception state of the reception signal is one of an auto gain control voltage, information indicating a carrier signal-to-noise ratio, and a bit error rate which are outputted from another receiving unit receiving the first RF signal of one line out of the plural lines to which the first RF signal is distributed by the splitter.

* * * * *